US011463865B1

(12) United States Patent
Buscher

(10) Patent No.: US 11,463,865 B1
(45) Date of Patent: Oct. 4, 2022

(54) WIRELESS TELECOMMUNICATION SERVICE TRIAL VIA A DUAL-SIM USER DEVICE

(71) Applicant: T-Mobile USA, Inc., Bellevue, WA (US)

(72) Inventor: Alexandra Buscher, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/240,937

(22) Filed: Apr. 26, 2021

(51) Int. Cl.
*H04W 8/18* (2009.01)
*H04W 24/08* (2009.01)

(52) U.S. Cl.
CPC .......... *H04W 8/183* (2013.01); *H04W 24/08* (2013.01)

(58) Field of Classification Search
CPC ... H04W 88/06; H04W 60/005; H04W 48/18; H04W 36/14
See application file for complete search history.

(56) References Cited

U.S. PATENT DOCUMENTS

| 2012/0102008 A1* | 4/2012 | Kaariainen | G06F 21/10 707/705 |
| 2016/0174187 A1* | 6/2016 | Gopala Krishnan | H04W 68/02 455/458 |
| 2017/0201876 A1* | 7/2017 | Tamagawa | H04L 67/1001 |
| 2022/0159607 A1* | 5/2022 | Singh | H04W 60/005 |

* cited by examiner

Primary Examiner — Kevin Kim
(74) Attorney, Agent, or Firm — Han Santos, PLLC

(57) ABSTRACT

A network trial platform of a wireless carrier network may receive a request to use trial wireless telecommunication services provided by the wireless carrier network from an instance of a trial application on a user device that is currently using wireless telecommunication services provided by a competitor wireless carrier network. The network trial platform may determine based at least on device information of the user device whether the user device is capable of using of an additional SIM to access the wireless carrier network in addition to using a current SIM to obtain the wireless telecommunication services from the competitor wireless carrier network. In response to a determination that the user device is capable of supporting the use of the additional SIM, the network trial platform may establish a trial subscriber account associated with the user device to provide the user device with access to trial wireless telecommunication services.

20 Claims, 7 Drawing Sheets

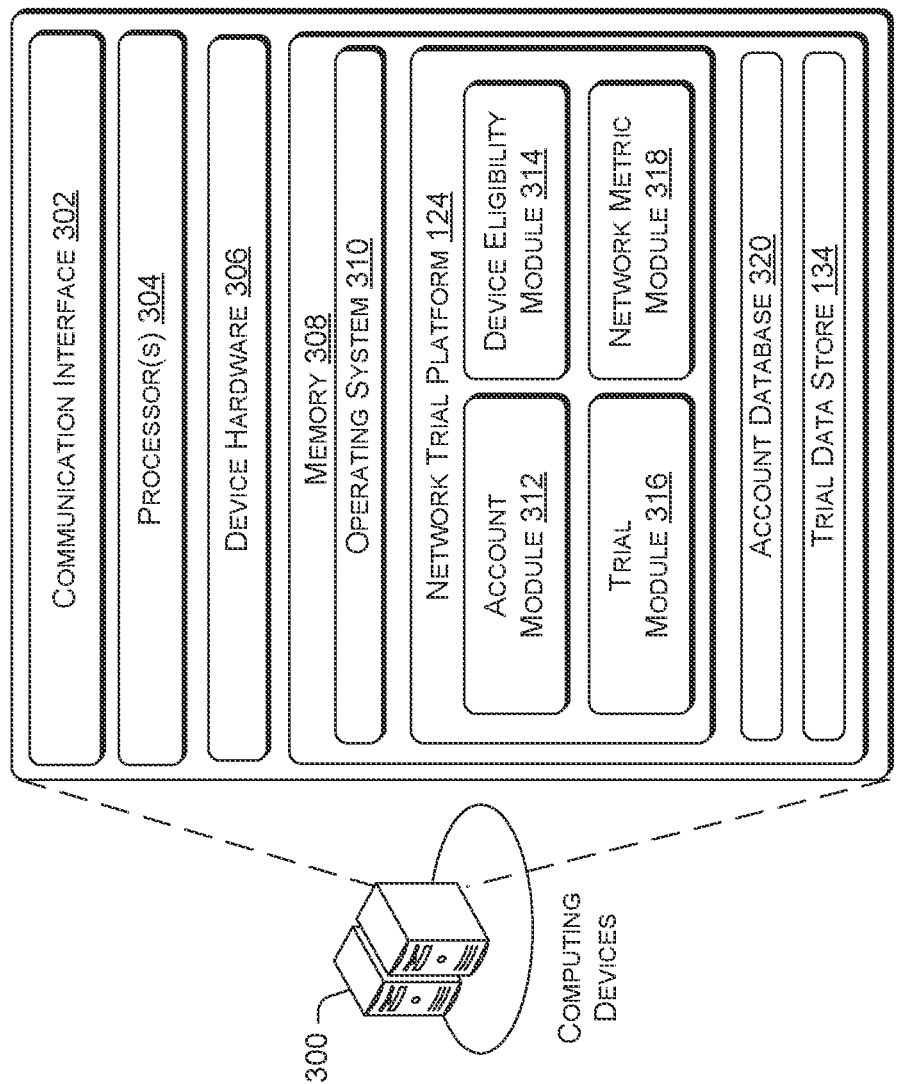

WIRELESS TELECOMMUNICATION SERVICE TRIAL VIA A DUAL-SIM USER DEVICE

BACKGROUND

It is often difficult for users to determine whether an advertised performance of one wireless carrier network measures up to the performance of another wireless carrier network without interacting with both networks. Further, it is also difficult to have a side-by-side comparison of the network performances of two different wireless carrier networks without replicating the same network communication activity on each network under the same conditions. As a result, a wireless service subscriber who is generally satisfied with the performance of an existing wireless carrier network often has little incentive or motivation to switch to another wireless carrier network that may in fact offer a superior network experience.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 3 is a block diagram showing various components of a network trial platform that supports the trial use of the wireless telecommunication services provided by the wireless carrier network.

DETAILED DESCRIPTION

Figure 1:
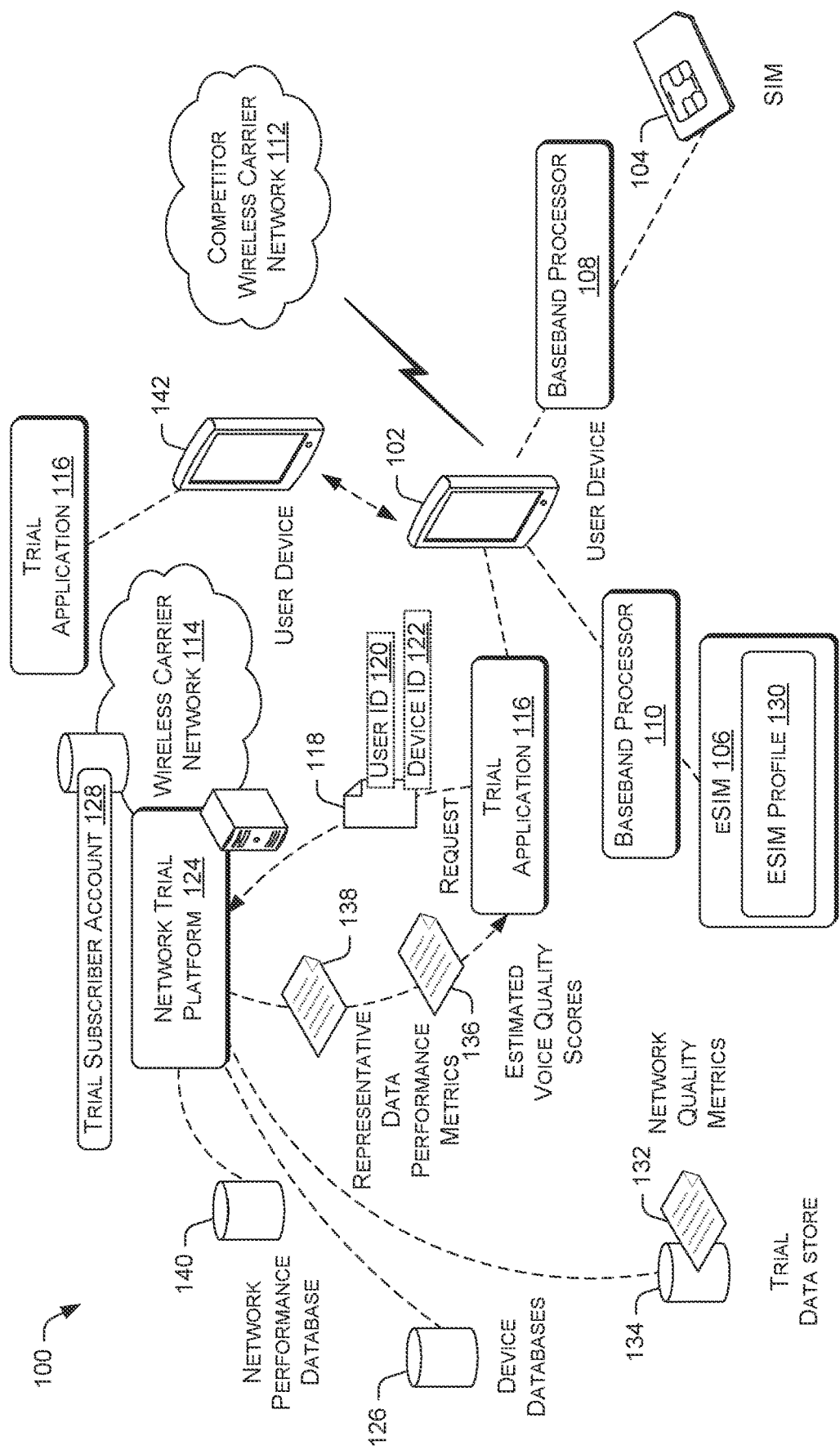
FIG. 1 illustrates an example architecture that enables the use of a dual-Subscriber Identity Module (SIM) user device to perform a trial use of the wireless telecommunication services provided by a wireless carrier network.

This disclosure is directed to techniques that enable a wireless carrier network to provide a subscriber of a competitor wireless carrier network with an opportunity to experience a trial use of wireless telecommunication services provided by the wireless carrier network. The techniques leverage a dual-Subscriber Identity Module (SIM) user device of the subscriber, such that the trial use can be implemented without the subscriber having to interrupt or deactivate the current wireless telecommunication services that the subscriber is using from the competitor wireless carrier network. The dual-SIM user device may be a wireless communication device that is equipped with two SIMs and two baseband processors in a either a dual call/dual standby (DCDS) configuration or a dual call/dual active (DCDA) configuration. The DCDS and DCDA configurations enable the dual-SIM user device to concurrently communicate with two different wireless carrier networks. A SIM in the dual-SIM user device may be a removable smart card SIM that fits into a SIM slot of the dual-SIM user device. Alternatively, or concurrently, the SIM may be an embedded Subscriber Identity Module (eSIM). The eSIM, also referred to as an embedded Universal Integrated Circuit Card (eUICC), may be mounted internally in the dual-SIM user device. For example, the eUICC is an integrated circuit that is not designed to be user-removable, i.e., it may be mounted with or soldered to other electronic components of the user device. A SIM may contain a SIM profile that stores a unique international mobile subscriber identity (IMSI) number. In turn, the IMSI number may be used to authenticate a subscriber to a wireless carrier network. Other data that are stored in the SIM profile may include carrier network information, security authentication information, a list of accessible network services, and/or so forth. A SIM in the form of a smart card is generally capable of storing a single SIM profile, while an eSIM may be capable of storing multiple eSIM profiles.

Despite its dual-SIM capability, the dual-SIM user device is often equipped with just a single default SIM that is supplied by a default wireless carrier network. The default SIM may enable the dual-SIM user device to receive communication services from the default wireless carrier network via a first baseband processor of the dual-SIM user device. This partial use of the dual-SIM capability allows an operator of an alternative wireless carrier network to install an alternative SIM on the dual-SIM user device. The alternative SIM may enable the dual-SIM user device to concurrently communicate with the alternative wireless carrier network via a second baseband processor of the dual-SIM user device. In some instances, the installation of the alternative SIM may be achieved by providing a user of the dual-SIM user device with a smart card SIM that the user places into a SIM card slot of the dual-SIM user device. In other instances, the installation of the alternative SIM may be achieved by obtaining user authorization to download a corresponding eSIM profile into the eSIM of the dual-SIM user device. In this way, a wireless carrier network may use the ability of the dual-SIM user device to concurrently communicate with two wireless carrier networks to provide the subscriber with an opportunity to experience a trial use of the wireless telecommunication services provided by the wireless carrier network without interrupting the services provided to the user device by a competitor wireless carrier network. For example, the wireless carrier network may enable a subscriber to use the user device to download content from the Internet via the wireless carrier network while still using the user device to make outgoing calls or receive incoming calls via the competitor wireless carrier network, or vice versa.

In various embodiments, the wireless carrier network may supply a trial application that enables the subscriber to view and experience the benefits of the wireless carrier network. The trial application may enable the subscriber to initiate a request to sign up the dual-SIM user device for a trial use of the wireless telecommunication services provided by the wireless carrier network. The request, which includes a unique user identifier of the subscriber and a device identifier of the dual-SIM user device, may be received by a network trial platform of the wireless carrier network. The network trial platform may use the device identifier to perform a compatibility check to determine whether the dual-SIM user device is capable of using the trial wireless telecommunication services provided by the wireless carrier network without interrupting or deactivating the current wireless telecommunication services that the dual-SIM user device is using from the competitor wireless carrier network.

When the dual-SIM user device passes the compatibility check, the network trial platform may determine whether the unique user identifier in the request was previously used for a trial subscriber account that enables the subscriber to use the trial wireless telecommunication services. If the unique user identifier is not associated with an existing trial subscriber account, the network trial platform may permit a trial subscriber account to be established for the dual-SIM user device based on the unique user identifier. Accordingly, the dual-SIM user device is permitted to use the trial wireless telecommunication services of the wireless carrier network as long as the trial subscriber account is active. Alternatively, if the unique user identifier is already associated with an existing trial subscriber account, the network trial platform may permit the dual-SIM user device to access the trial wireless telecommunication services if the existing trial subscriber account is still active. This is because a trial subscriber account is configured to automatically become inactive at an end of a predetermined trial time period.

During the predetermined trial time period, the network trial platform may collect network quality metrics that are related to the use of trial wireless telecommunication services at various locations via the dual-SIM user device. For example, the collected network quality metrics may include call quality metrics for outgoing and incoming voice calls made and received at the various locations via the dual-SIM user device. The collected network quality metrics may further include data performance metrics that are related to data downloads and/or uploads performed at various locations during the predetermined trial time period via the dual-SIM user device. The network trial platform may provide one or more network quality metrics for one or more locations to the trial application on the dual-SIM user device based on queries inputted via the trial application. In turn, the trial application may present the network quality metrics via a display of the dual-SIM user device.

In some embodiments, the trial application may further present estimated voice call quality scores for various locations that are inputted by the subscriber. The estimated call quality score for a location may be calculated by the network trial platform based on call quality metrics that are collected for one or more user devices that are comparable to the dual-SIM user device during a recent time period. This enables a user of the trial application to view voice connectivity data that is comparable to what is available on a current user device of the user, without interrupting the default voice configuration of their current wireless telecommunications provider in a DCDS configuration. In additional embodiments, the trial application may further present representative data performance metrics for specified locations, such as locations that have not been visited by the subscriber. A representative network performance metric for a location may be calculated based on the individual network performance metric values of one or more user devices that are comparable to the dual-SIM user device at the location during a recent time period.

In other embodiments, the subscriber may switch from using the dual-SIM user device to a new dual-SIM user device. For example, the subscriber may download and install another instance of the trial application onto the new dual-SIM user device. In turn, the network trial platform may determine whether the new dual-SIM user device is capable of supporting access to the trial wireless telecommunication services of the wireless carrier network. Once the new dual-SIM user device is verified to be capable, the network trial platform may determine based on the unique user identifier provided via the new dual-SIM user device whether the trial subscriber account is still active. If the trial subscriber account is still active, the network trial platform may switch the access to the trial wireless telecommunication services from the dual-SIM user device to the new dual-SIM user device for the remainder of the predetermined trial time period. However, even if the network trial platform determines that the new dual-SIM user device is incapable of supporting access to the trial wireless telecommunication services, or that the trial subscriber account is no longer active, the network trial platform may nevertheless provide the instance of the trial application on the new dual-SIM user device with access to the network quality metrics, the estimated voice quality scores, and/or the representative data performance metrics that are previously collected or generated for the dual-SIM user device.

The ability of a wireless carrier network to provide a subscriber of a competitor wireless carrier network with concurrent access to trial wireless telecommunication services of the wireless carrier network for a predetermined trial time period may enable the subscriber to get a realistic comparison of the services offered by the two wireless carrier networks. Since the trial wireless telecommunication services are provided via a dual-SIM user device that does not interrupt or deactivate access to the wireless telecommunication services provided by the competitor wireless carrier network, meaning that no incoming calls or messages from existing contacts will be missed, the subscriber may be motivated to try out the wireless carrier network without undue hassle and eventually make a switch to the wireless carrier network. The techniques described herein may be implemented in a number of ways. Example implementations are provided below with reference to the following FIGS. 1-6.

Example Architecture

FIG. 1 illustrates an example architecture that enables the use of a dual-Subscriber Identity Module (SIM) user device to perform a trial use of the wireless telecommunication services provided by a wireless carrier network. The user device 102 may be a smartphone, a smartwatch, a tablet computer, a phablet, or any other wireless communication device. The user device 102 may be equipped with dual removable smart card SIMS, dual embedded Subscriber Identity Modules (eSIMs), or a combination of one smart card SIM and one eSIM. A removable smart card SIM may fit into a SIM slot of the user device 102. An eSIM may be an embedded Universal Integrated Circuit Card (eUICC) that is mounted internally in the dual-SIM user device. Each of the SIM and eSIM may contain a SIM profile or an eSIM profile, respectively, that stores a unique international mobile subscriber identity (IMSI) number that authenticates a subscriber to a wireless carrier network. Other data that are stored in the SIM profile or eSIM profile may include carrier network information, security authentication information, a list of accessible network services, and/or so forth. A SIM in the form of a smart card is generally capable of storing a single SIM profile, while an eSIM may store multiple eSIM profiles. Further, one or more eSIM profiles may be downloaded into the eSIM as new eSIM profiles or updated eSIM profiles.

In other embodiments, an eSIM profile may be is stored in a trusted environment of the user device 102. The trusted environment is an isolated execution space that is provided by dedicated software and/or hardware of the user device 102. For example, the trusted environment may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the trusted environment may be executed by a dedicated processor. The isolation of the trusted environment provides a high level of security for the execution of code or the processing of data stored in the execution space.

As an illustrative example, the user device 102 is shown in FIG. 1 as a dual-SIM user device that is equipped with a SIM 104 and an eSIM 106. However, the user device 102 may be equipped with any two of SIMS or eSIMs. Thus, the SIM 104 may be substituted with an equivalent eSIM, and the eSIM 106 may be substituted with an equivalent SIM in alternative instances. For the purpose of simplifying the discussion, both SIM and eSIM may be referred to herein as SIM for convenience. The user device 102 is further equipped with a baseband processor 108 and a baseband processor 110. The baseband processors 108 and 110 and the two SIMs may be configured in a dual call/dual standby (DCDS) configuration. Accordingly, the baseband processor 108 and the SIM 104, also referred to as the default SIM 104, may be configured to enable the user device 102 to obtain wireless telecommunication services from the competitor wireless carrier network 112. For example, the SIM 104 may be supplied by the competitor wireless carrier network 112 for installation into the user device 102. Likewise, the baseband processor 110 and the eSIM 106, also referred to herein as the alternative SIM, may enable the user device 102 to collect trial wireless telecommunication services from the wireless carrier network 114. For example, the trial wireless telecommunication services may include voice calling and data services. In some instances, the trial wireless telecommunication service may also include customer care support services.

In various embodiments, the wireless carrier network 114 may supply a trial application 116 that enables a subscriber to view and experience the benefits of the wireless carrier network 114 at the user device 102, without having to interrupt or deactivate the services the user device 102 receives from the competitor wireless carrier network 112. For example, the trial application 116 may be an over-the-top (OTT) application. Accordingly, the subscriber may download an instance of the trial application 116 from an online application portal and install the trial application 116 on the user device 102.

The trial application 116 may enable the subscriber to initiate a request 118 to sign up the user device 102 for a trial use of the wireless telecommunication services provided by the wireless carrier network 114. The request 118, which includes a unique user identifier 120 of the subscriber and a device identifier 122 of the user device 102, may be received by a network trial platform 124 of the wireless carrier network 114. For example, the unique user identifier 120 may be an email address, a social security number, a driver's license number, a credit card number, or some other unique identifier of the subscriber. In other examples, the unique user identifier 120 may be derived from identifying data passed along from an online app store or another online marketplace used to download and install the trial application 116 for trial service activation. The device identifier 122 may be an International Mobile Equipment Identity (IMEI), an Embedded Universal Integrated Circuit Card Identifier (EID), an Integrated Circuit card Identifier (ICCID), or another identifier that uniquely identifies the user device 102. The network trial platform 124 may use the device identifier 122 to perform a compatibility check to determine whether the user device 102 is capable of using the trial wireless telecommunication services provided by the wireless carrier network 114 without interrupting or deactivating the current wireless telecommunication services that the user device 102 is using from the competitor wireless carrier network 112. In various embodiments, the network trial platform 124 may use one or more device databases 126 to perform the compatibility check. For example, the network trial platform 124 may use the device databases 126 to determine whether the user device 102 with the device identifier 122 is a dual-SIM user device that is able to accept the provisioning of a compatible eSIM profile or smart card SIM into the user device 102 for accessing the wireless carrier network 114. If the user device 102 is able to do so, then the network trial platform 124 may designate the user device 102 as having passed the compatibility check.

When the user device 102 passes the compatibility check, the network trial platform 124 may determine whether the unique user identifier 120 in the request 118 was previously used for a trial subscriber account that enables the subscriber to use the trial wireless telecommunication services. If the unique user identifier 120 is not associated with an existing trial subscriber account, the network trial platform 124 may permit a trial subscriber account 128 to be established in an accounts database for the user device 102 based on the unique user identifier. In various embodiments, the network trial platform 124 may direct a customer support function (e.g., a business support system (BSS) or an operation support system (OSS)) of the wireless carrier network 114 to establish the trial subscriber account 128. During the establishment of the trial subscriber account 128, the network trial platform 124 may request that the subscriber submit login credentials (e.g., username, password, etc.) that can be used to subsequently access the trial subscriber account 128. The login credentials are then associated by the network trial platform 124 with the unique user identifier 120. Accordingly, the user device 102 is permitted to use the trial wireless telecommunication services of the wireless carrier network 114 as long as the trial subscriber account 128 is active.

Alternatively, if the unique user identifier is already associated with an existing trial subscriber account, the network trial platform 124 may permit the user device 102 to access the trial wireless telecommunication services if the existing trial subscriber account is still active. This is because a trial subscriber account is configured to automatically become inactive at an end of a predetermined trial time period. In this alternative scenario, the network trial platform 124 will allow the user device 102 to access the trial wireless telecommunication services for the remainder of the predetermined trial time period. In at least one embodiment, the network trial platform 124 may grant the user device 102 access by directing the trial application, which has a local profile assistant (LPA) function, to download an eSIM profile configured for the wireless carrier network 114 (e.g., eSIM profile 130) from a remote SIM provisioning (RSP) platform used by the wireless carrier network 114 to the user device 102. In this way, the user device 102 may use the eSIM profile to access the trial wireless telecommunication services of the wireless carrier network 114. In other embodiments, the network trial platform 124 may direct the customer support function of the wireless carrier network 114 to initiate a delivery of a smart card SIM to the subscriber. In this way, the subscriber may install the smart card SIM into the user device 102 to access the trial wireless telecommunication services.

During the predetermined trial time period, the network trial platform 124 may collect network quality metrics 132 that are related to the use of trial wireless telecommunication services at various locations via the user device 102. For example, the collected network quality metrics 132 may include call quality metrics for outgoing and incoming voice calls made and received at the various locations via the user device 102. The call quality metrics that are specific to a location may include a call setup success ratio, an average quality of speech score, a handover success rate, a voice call drop rate, and/or so forth. Further, the network trial platform 124 may also calculate representative call quality metrics for various combinations of outgoing and/or incoming voice calls made and received at multiple locations during the predetermined trial time period, or any time portion of the predetermined trial time period, based on user selections inputted via the trial application. In various instances, a representative call quality metric may be calculated for incoming voice calls received at multiple locations, for outgoing voice calls made from multiple locations, or for both incoming and outgoing calls made and received at multiple locations. The multiple locations may include particular locations selected via the trial application, such as specific locations or all locations at which voice calls are made and/or received.

The collected network quality metrics 132 may further include data performance metrics that are related to data downloads and/or uploads performed at various locations during the predetermined trial time period via the user device 102. The data downloads and/or uploads may be performed as the subscriber uses applications on user device 102 to interact with network-based services. For example, the data performance metrics that are specific to a location may include a data download speed, a data upload speed, a network latency measurement, a packet loss rate, and/or so forth. Further, the network trial platform 124 may also calculate summary data performance metrics for various combinations of data uploads and/or data downloads at multiple locations during the predetermined trial time period or any time portion of the predetermined trial time period based on user selections inputted via the trial application. In various instances, a summary data performance metric may be calculated for all data uploads at multiple locations or for all data downloads at multiple locations. The multiple locations may include particular locations selected via the trial application, such as specific locations or all locations at which data uploads or data downloads are performed.

The network trial platform 124 may provide the one or more network quality metrics for the one or more locations to the trial application 116 on the user device 102 based on queries inputted via the trial application. In turn, the trial application 116 may present the requested network quality metrics via a display of the user device 102. For example, the network quality metrics may be displayed on a coverage map that shows the one or more selected network quality metrics at the one or more locations. Further, the network trial platform 124 may store the network quality metrics 132 that are related to a user device 102 in a trial data store 134 of the wireless carrier network 114. The network quality metrics that are related to the user device 102 may be indexed in the trial data store based on a key value, such as the unique user identifier 120 associated with the user device 102.

In some embodiments, the trial application 116 may further present estimated voice call quality scores 136 for various locations that are inputted by the subscriber. For example, the subscriber may use the trial application 116 to request an estimated voice quality score for a location, such as a location that has not been visited by the subscriber. In response to a request for the estimated voice quality score for the location, the network trial platform 124 may retrieve call quality metrics associated with the location. The call quality metrics may be collected for one or more user devices that are comparable to the dual-SIM user device during a recent time period. For example, the call quality metrics may include a call setup success ratio, an average quality of speech score, a handover success rate, a voice call drop rate, and/or so forth. The call quality metrics may be retrieved by the network trial platform 124 from a network performance database 140 of the wireless carrier network 114. Subsequently, the network trial platform 124 may apply a machine-learning algorithm or a mathematical algorithm to the call quality metrics associated with the location to generate an estimated voice call quality score for the location. The network trial platform 124 may provide the estimated voice call quality score for a location to the trial application 116 on the user device 102. In turn, the trial application 116 may present the estimated voice call quality score of the location via a display of the user device 102. For example, the estimated voice call quality score of the location may be displayed on a representative coverage map. In some instances, the estimated voice call quality score of the location may be displayed on the coverage map with one or more other estimated voice call quality scores and/or call quality metrics of other locations.

In additional embodiments, the trial application 116 may further present representative data performance metrics 138 for specified locations, such as locations that have not been visited by the subscriber. Accordingly, the network trial platform 124 may provide representative data performance metrics 138 for the specified locations in response to requests that are inputted via the trial application 116. A representative network performance metric for a location may be calculated based on the individual network performance metric values of one or more user devices that are comparable to the dual-SIM user device at the location during a recent time period. For example, the representative data performance metrics for a location may include an average data download speed, an average data upload speed, an average network latency, an average packet loss rate, and/or so forth. The individual network performance metric values may be retrieved by the network trial platform 124 from the network performance database 140 of the wireless carrier network 114. In turn, the trial application 116 may present the one or more representative data performance metrics of the location via a display of the user device 102. For example, the one or more representative data performance metrics of the location may be displayed on the coverage map. In some instances, the one or more representative data performance metrics of the location may be displayed on the coverage map with various metrics of other locations.

In other embodiments, the subscriber may switch from using the user device 102 to a new user device 142. For example, the subscriber may download and install another instance of the trial application 116 onto the new user device 142. Subsequently, the subscriber may use the trial application 116 to submit login credentials to the network trial platform 124 to access the trial subscriber account 128. Following verification of the login credential, the network trial platform 124 may determine whether the new user device 142 is capable of supporting access to the trial wireless telecommunication services of the wireless carrier network by performing a compatibility check. Once the new dual-SIM user device is verified to be capable, the network trial platform 124 may determine whether the trial subscriber account 128 is still active. If the trial subscriber account 128 is still active, the network trial platform 124 may direct the trial application 116 to offer an option to switch the access to the trial wireless telecommunication services from the user device 102 to the new user device 142 for the remainder of the predetermined trial time period. Accordingly, the network trial platform 124 may perform the switch if the subscriber input a confirmation to switch via the instance of the trial application 116. Furthermore, the subscriber may use the trial application 116 to access network quality metrics specific to the new user device 142 for various locations from the network trial platform 124. The network trial platform 124 may also provide the instance of the trial application 116 on the new user device 142 with access to the network quality metrics that are previously collected or generated for the user device 102 in response to user selections of the subscriber. However, even if the network trial platform 124 determines that the new user device 142 is incapable of supporting access to the trial wireless telecommunication services (i.e., failed the compatibility check) or that the trial subscriber account 128 is no longer active, the network trial platform 124 may nevertheless provide the instance of the trial application 116 on the new user device 142 with access to the network quality metrics 132, the estimated voice call quality scores 136, and/or the representative data performance metrics 138 that are previously collected or generated for the user device 102 in response to user selections of the subscriber.

Example Dual-SIM User Device

Figure 2:
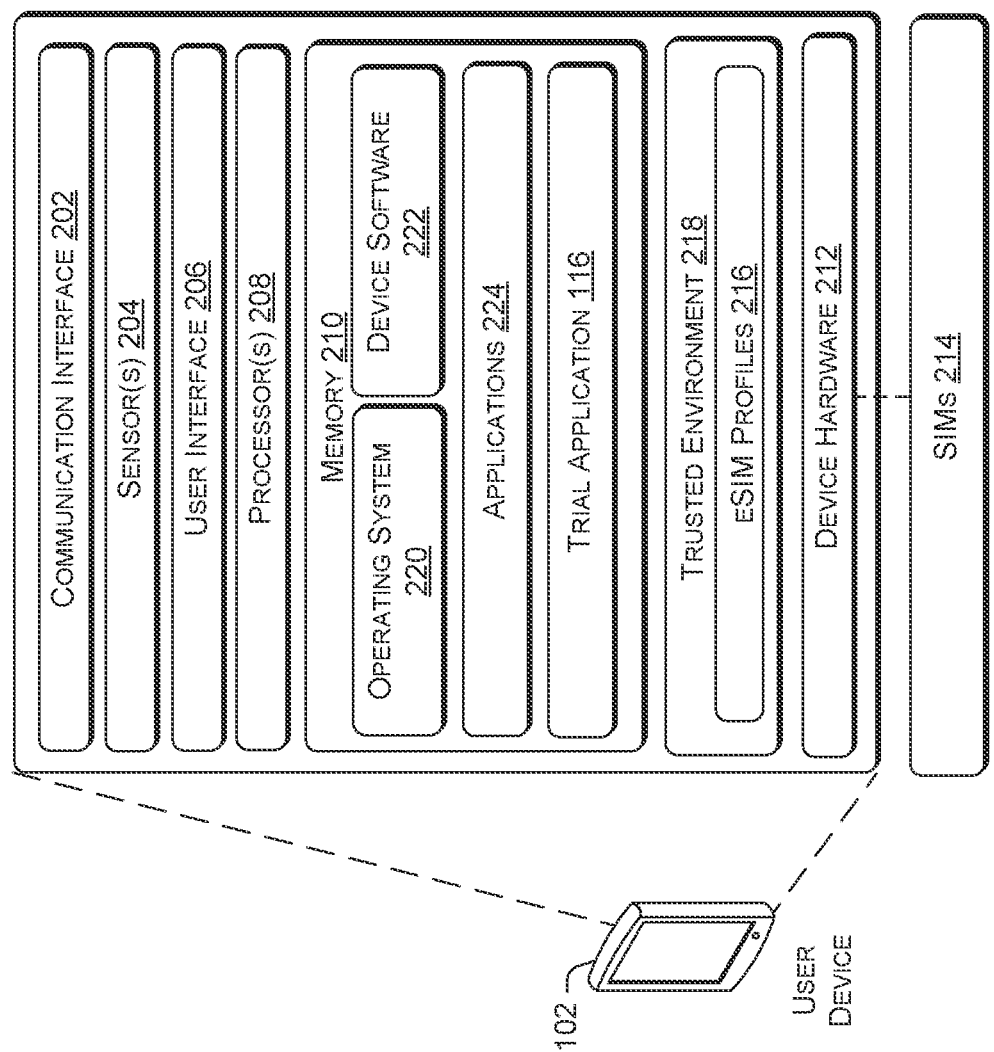
FIG. 2 is a block diagram showing various components of an illustrative dual-SIM user device that provides for the trial use of the wireless telecommunication services provided by the wireless carrier network.

FIG. 2 is a block diagram showing various components of an illustrative dual-SIM user device that provides side-by-side wireless carrier network experience comparison. The user device 102 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect the movement of objects that are proximate to the user device 102. The compass, the accelerometer, and the GPS sensor may detect orientation, movement, and geographical location of the user device 102. The cameras may capture images of the environment around the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouser devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include baseband processors, also referred to as cellular modems, that enable the user device 102 to perform telecommunication and data communication with various wireless carrier networks, as well as a short-range transceiver that enables the device to connect to other devices via short-range wireless communication links. The device hardware 212 may further include signal converters, antennas, hardware decoders and encoders, graphics processors, and/or the like that enable the user device 102 to execute applications and provide telecommunication and data communication functions. The baseband processors may be driven by modem software to perform telecommunication and data communication with a wireless communication network. The modem software may be firmware that is stored in dedicated non-volatile memory of the user device 102. Such non-volatile memory may include read-only memory (ROM), erasable programmable read-only memory (EPROM), or flash memory. The user device is further equipped with SIMs 214 that store multiple eSIM profiles. The SIMs 214 may include dual removable smart card SIMs, dual embedded Subscriber Identity Modules (eSIMs), or a combination of one smart card SIM and one eSIM. In some alternative embodiments, one or more eSIM profiles 216 may be instead stored in a trusted environment 218. The one or more processors 208 and the memory 210 may implement the trusted environment 218. The trusted environment 218 is an isolated execution space that is provided by dedicated software and/or hardware of a device.

The one or more processors 208 and the memory 210 of the user device 102 may implement an operating system 220, device software 222, one or more applications 224, and the trial application 116. Such software may include routines, program instructions, objects, and/or data structures that are executed by the processors 208 to perform particular tasks or implement particular abstract data types.

The operating system 220 may include components that enable the user device 102 to receive and transmit data via various interfaces (e.g., user controls, communication interface 202, and/or memory input/output devices). The operating system 220 may also process data using the one or more processors 208 to generate outputs based on inputs that are received via the user interface 206. For example, the operating system 220 may provide an execution environment for the execution of the applications 224. The operating system 220 may include a presentation component that presents the output (e.g., display the data on an electronic display, store the data in memory, transmit the data to another electronic device, etc.).

The operating system 220 may include an interface layer that enables applications to interface with the modem and/or the communication interface 202. The interface layer may comprise public APIs, private APIs, or a combination of both public APIs and private APIs. Additionally, the operating system 220 may include other components that perform various other functions generally associated with an operating system. The device software 222 may include software components that enable the user device to perform functions. For example, the device software 222 may include basic input/output system (BIOS), bootrom, or a bootloader that boots up the user device 102 and executes the operating system 220 following power-up of the device.

The applications 224 may include applications that provide utility, entertainment, and/or productivity functionalities to a user of the user device 102. For example, the applications 224 may include telephony applications, electronic mail applications, remote desktop applications, web browser applications, navigation applications, office productivity applications, multimedia streaming applications, an online shopping application, and/or so forth.

The trial application 116 may interface with the modem software of the baseband processors, such as the baseband processor 108, and/or interface with the operating system 220 of the user device 102. Accordingly, the trial application 116 may have the ability to switch the user device 102 between using the baseband processor 108/SIM 104 combination and using the baseband processor 110/SIM 106 for incoming and outgoing communications by interacting with the modem software of the baseband processors (e.g., sending commands or APIs calls). In this way, the user device 102 may wirelessly connect to both the competitor wireless carrier network 112 and the wireless carrier network 114.

In various embodiments, the trial application 116 may interact with the network trial platform 124 to provide the subscriber with various interface screens. These interface screens may include an authentication interface, a login interface, a trial session interface, a device switch interface, a trial status interface, a coverage view interface, and/or so forth. The trial application 116 may be configured with software modules that include routines, program instructions, objects, and/or data structures that provide the interface options. The authentication interface may enable the subscriber to create a new trial subscriber account by inputting a unique user identifier, login credentials, and/or other account information. Such account information, along with a device identifier of the user device 102, may be submitted by the trial application 116 to the network trial platform 124. In turn, the network trial platform 124 may use the device identifier to perform a compatibility test of the user device 102. Thus, the network trial platform 124 may provision the user device 102 with a SIM or an eSIM profile if the user device 102 passes the compatibility test, as well as establish a trial subscriber account that is associated with the unique user identifier.

The login interface may enable the user to login into the trial application 116 via the login credentials to interact with additional interfaces, such as the trial session interface, the device switch interface, the trial status interface, the coverage view interface, and/or so forth. The trial session interface may include interface controls (e.g., virtual buttons) that enable the subscriber to start a trial use of the wireless carrier network 114, suspend the trial use of the wireless carrier network 114, and resume the trial use of the wireless carrier network 114. An initiation of the trial use may cause the trial application 116 to direct the network trial platform 124 to begin a predetermined trial time period (e.g., 30-days) for the trial subscriber account that eventually terminates. An initiation of the trial use suspension during the predetermined trial time period may trigger the trial application 116 to stop the user device 102 from connecting to the wireless carrier network 114. Conversely, an initiation of the trial use resumption may trigger the trial application 116 to prompt the user device 102 to once again start connecting to the wireless carrier network 114.

The device switch interface may enable the subscriber to complete a trial use of the wireless carrier network 114 that is associated with an existing trial subscriber account on the user device 102 instead of a previous user device. The subscriber may initiate such a switch by entering the login credentials associated with the existing trial subscriber and activating a switch interface control. In turn, the trial application 116 may submit the login credentials associated with the switch request to the network trial platform 124. The trial status interface may present information related to the trial use of the wireless carrier network 114. The information may include a start date and time of the trial use, an expected end data and time of the trial use, the network identity of the wireless carrier network to which the user device is currently connected, and/or so forth. In some instances, the information may further include a countdown date and time clock that shows the amount of day and time left in the predetermined trial time period. The coverage view interface may enable the subscriber to select network quality metrics, representative data performance metrics, and/or estimated voice quality scores of various locations for display. For example, the subscriber may select a particular location by entering an address, selecting an address or location from a pre-populated drop-down list, selecting a business or entity name for a search result list, dropping a virtual pin on a map, etc. In turn, the corresponding data may be retrieved by the trial application 116 and displayed in the coverage view interface via one or more coverage maps that show information for various locations on the maps, tables of data labels and data values, and/or other presentation techniques.

Example Network Comparison Components

FIG. 3 is a block diagram showing various components of one or more illustrative computing devices that support side-by-side wireless carrier network experience comparison. The computing devices 300 may include a communication interface 302, one or more processors 304, memory 306, and device hardware 308. The communication interface 302 may include wireless and/or wired communication components that enable the computing devices 300 to transmit data to and receive data from other networked devices. The device hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouser devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 300 or components thereof may be virtual computing devices in the form of virtual machines or software containers that are hosted in a computing cloud.

The computing devices 300 may implement an operating system 310 and a network trial platform 124. The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The operating system 310 may support the operations of the network trial platform 124.

The network trial platform 124 may include an account module 312, a device eligibility module 314, a trial module 316, and a network metric module 318. Such modules may include routines, program instructions, objects, and/or data structures that are executed by the processors 208 to perform particular tasks or implement particular abstract data types.

The account module 312 may receive a unique user identifier and login credentials that are associated with a request to establish a trial subscriber account. The request may be received from a trial application, such as the trial application 116. In turn, the account module 312 may establish a trial subscriber account associated with the unique user identifier in the accounts database 320 if there are no existing trial subscriber account associated with the unique user identifier and the associated user device passes a compatibility check conducted by the device eligibility module 314. Subsequently, the account module 312 may receive a login request with the login credentials from a trial application. Accordingly, the account module 312 may direct the trial application to grant or deny access to data stored in a trial subscriber account based on whether the submitted login credentials match the stored login credentials for the trial subscriber account.

The device eligibility module 314 may determine whether a user device is eligible for use with the trial telecommunication services provided by the wireless carrier network 114 based on the device identifier of the user device. The device eligibility module 314 may compare the device identifier to information stored in the one or more device databases 126. The device identifier may be an IMEI, an EID, an Integrated Circuit card Identifier ICCID, or another identifier that uniquely identifies the user device. The one or more device databases 126 may include one or more databases that are maintained by the wireless carrier network 114 and/or one or more databases that are maintained by third-party service providers. These third-party service providers may include device manufacturers, eSIM providers, other wireless carrier networks, and/or so forth. A database may correlate device identifiers to specific brands and/or models of dual-SIM user devices. Another database may indicate the compatibility of a particular brand and/or model of a dual-SIM user device with different types of eSIMs or smart card SIMS. An additional database may contain device identifiers of multiple dual-SIM user devices and also track the carrier lock status of the multiple dual-SIM user devices. A dual-SIM user device that is carrier locked to a particular wireless carrier network may be ineligible to use a second SIM to communicate with a different wireless carrier network. One other database may include the device identifiers of user devices that are associated with active subscriber billing accounts of the wireless carrier network 114, in which such associations make the user devices eligible for trial wireless telecommunication services of the wireless carrier network 114. Some other databases may contain device identifiers and multiple dual-SIM user devices and also track the number of eSIM profile slots available in an eSIM in each of the multiple dual-SIM user devices and/or the number of smart card SIM slots available in each of the multiple dual-SIM user devices.

Thus, by comparing the device identifier of the user device with the information stored in the device databases 126, the device eligibility module 314 may perform a compatibility check to determine whether the user device is capable of using the trial wireless telecommunication services provided by the wireless carrier network 114. If the determination is that the user device is capable, the device may trigger a remote RSP platform to provision the user device with an eSIM profile for accessing the trial wireless telecommunication services of the wireless carrier network 114. In other embodiments, the account module 312 may direct the customer support function of the wireless carrier network 114 to initiate a delivery of a smart card SIM that includes a SIM profile to the subscriber. The eSIM or the SIM profile is associated with a Mobile Station International Subscriber Directory Number (MSISDN) that enables the user device to make and receive voice calls. However, if the determination is that the user device is capable, the device eligibility module 314 may trigger the trial application on the user device to present a notification that the trial wireless telecommunication services are not available at the user device.

The trial module 316 may receive requests to start a new trial use or switch the trial use to a new user device, in which each request includes a unique user identifier. For example, such requests may be sent by a trial application in response to user inputs to a trial session interface, or from data passed along from the online app store or the online marketplace used to download and install the trial application. For a request to start a trial use, the trial module 316 may initiate a predetermined trial time period (e.g., 30-days) for a trial subscriber account associated with the unique user identifier, assuming no trial period was previously initiated for the account. The trial subscriber account is configured to automatically become inactive at an end of a predetermined trial time period. Once the account is inactive, the trial module 316 may trigger the wireless carrier network 114 to deny the user device access to the trial wireless telecommunication services. For example, the trial module 316 may notify a home location register (HLR) or a home subscriber server (HSS) of the wireless carrier network 114 to deactivate the SIM of the user device. In some instance, the trial module 316 may be configured to deactivate a trial subscriber account when the trial module 316 receives a notification from a customer support function of the wireless carrier network 114 that the subscriber with the unique user identifier has signed up for a billing account for non-trial use of the wireless telecommunication services provided by the wireless carrier network 114.

In some instances, the trial module 316 may determine whether the trial subscriber account associated with the unique user identifier is active or inactive in response to requests to continue trial use. For a request to switch the trial use to a new user device, the trial module 316 may use the device eligibility module 314 to determine whether the new user device passes a compatibility check. Assuming that the new user device passes the compatibility check, the trial module 316 may perform the switch as long as the corresponding trial subscriber account associated with the unique user identifier is still active. The trial module 316 may trigger the wireless carrier network 114 to terminate the access of an existing user device to the trial wireless telecommunication services and provide the new user device access to the trial services. For example, the trial module 316 may notify the HLR or the HSS of the wireless carrier network 114 to deactivate the SIM of the user device, as well as notify the RSP platform or the BSS of the wireless carrier network 114 to provision the new user device with an active SIM (e.g., an eSIM profile or a smart card SIM) that enables access to the trial wireless telecommunication services. The trial module 316 may track the device switches for each trial subscriber account via the corresponding devices identifiers in the trial data store 134, in which the information is indexed via corresponding unique user identifiers of the trial subscriber accounts.

The network metric module 318 may collect network quality metrics for a user device during the predetermined trial time period as the user device uses the trial wireless telecommunication services at various locations. In various embodiments, the collected network quality metrics may include call quality metrics for outgoing and incoming voice calls made and received at the various locations via the user device. The network metric module 318 may be further configured to calculate representative call quality metrics for various combinations of outgoing and/or incoming voice calls made and received at multiple locations during the predetermined trial time period or any time portion of the predetermined trial time period based on user selections inputted via a trial application of the user device. The collected network quality metrics may further include data performance metrics that are related to data downloads and/or uploads performed at various locations during the predetermined trial time period via the dual-SIM user device. The network metric module 318 may further be configured to calculate summary data performance metrics for various combinations of data uploads and/or data downloads at multiple locations during the predetermined trial time period or any time portion of the predetermined trial time period based on user selections inputted via the trial application of the user device. In various embodiments, the network metric module 318 may provide the collected network quality metrics for a location to a trial application on a user device in response to a user query that is inputted at the user device.

In some embodiments, the network metric module 318 may calculate estimated voice call quality scores 136 for various locations. For example, the subscriber may use the trial application 116 on the user device 102 to request an estimated voice quality score for a location, such as a location that has not been visited by the subscriber. In response to a request for the estimated voice quality score for the location, the network metric module 318 may retrieve call quality metrics associated with the location from the network performance database 140. The call quality metrics may be collected for one or more user devices that are designated as comparable to the dual-SIM user device during a recent time period (e.g., the last 30 days, the last 15 days, etc.). For example, the call quality metrics may include a call setup success ratio, an average quality of speech score, a handover success rate, a voice call drop rate, and/or so forth. A quality of speech score for a user device at a location may be an estimate that is derived based on a signal robustness measurement of the base station radio signal received by the user device at the location. A signal robustness may be measured in a multitude of ways, such as via signal strength values or signal quality values. Signal strength may be measured via received signal strength indicator (RSSI), reference signal received power (RSRP), received channel power indicator (RCPI), or other signal strength measurements. Signal quality may be measured through energy to interface ratio (ECIO), reference signal received quality (RSRQ), signal to interference-plus-noise ratio (SINR), or other signal quality measurements. Other signal quality measurements may include received signal code power (RSCP) for 3G communication links, block error rate (BLER) for 5G communication links, and/or so forth. Thus, a signal robustness measurement that correlates with a stronger base station radio signal at the location may be translated into a higher quality of speech score. Conversely, a signal robustness measurement that correlates with a weaker base station radio signal at the location may be translated into a lower quality of speech score.

A comparable user device may share one or more similar device characteristics with the user device. The similar device characteristics may include the comparable user device using the same network access technology (e.g., 3G, 4G, 5G, etc.) as the user device, the comparable device being manufactured by the same manufacturer as the user device, the comparable device being a model that is released within a predetermined amount of time before or after the user device, the comparable device having the same or similar processor speed as the user device, the comparable device running the same operating system as the user device, and/or so forth. Further, a call quality metric of a user device may be designated as being associated with the location when the call quality metric or a metric value that that call quality metric is based on is collected while the user device is at the location or within a predetermined distance of the location. In various embodiments, the network metric module 318 may check a device identifier of the user device against the information in one or more device databases 126 to identify the device characteristics of the user device. The device characteristics of the user device are then used by the network metric module 318 to identify one or more user devices with similar device characteristics. An estimated voice call quality score may be a numerical value score on a predetermined scale (e.g., 1-5), in which a higher score represents a higher voice call quality than a lower score. In some instances, the numerical value scores may be translated into descriptive ratings. For example, for numerical value scores on a predetermined scale of 1-3, a "3" may be translated into "high voice call quality", a "2" may be translated into "moderate voice call quality", and a "1" may be translated into "low voice call quality."

In some embodiments, the network metric module 318 may use a mathematical function to calculate an estimated voice call quality score for a location-based on call quality metrics of user devices. For example, the mathematical function may assign different weighting values to each type of call quality metric of user devices at a location, such as the call setup success ratio, the average quality of speech score, the handover success rate, the voice call drop rate, and/or so forth. Once the weighting values are assigned, the mathematical function may sum the weighted call quality metric values, average the weighted call quality metric values, and/or perform one or more other mathematical transformations with respect to the call quality metric values to generate an estimated voice call quality score for the location.

In other embodiments, the network metric module 318 may apply a machine-learning algorithm to calculate an estimated voice call quality score for a location-based on call quality metrics of user devices. The machine learning algorithm may implement a training data input phase, a feature engineering phase, and a model generation phase. In the training data input phase, the model training algorithm may receive training data. For example, each of the individual training datasets in the training data may include multiple sets of call quality metrics of user devices at multiple locations, in which each set of call quality metrics is labeled with a corresponding voice call quality score. During the feature engineering phase, the model training algorithm may pinpoint features in the training data. Accordingly, feature engineering may be used by the model training algorithm to figure out the significant properties and relationships of the input datasets that aid a machine-learning model to distinguish between different classes of data.

During the model generation phase, the model training algorithm may select an initial type of machine-learning algorithm to train a machine-learning model using the training data. Following the application of a selected machine-learning algorithm to the training data, the model training algorithm may determine a training error measurement of the machine-learning model. If the training error measurement exceeds a training error threshold, the model training algorithm may use a rule engine to select a different type of machine-learning algorithm based on a magnitude of the training error measurement. The different types of machine-learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and a trained machine-learning model is generated. The machine-learning model is then applied by the network metric module 318 to call quality metrics of user devices at a location to generate an estimated call quality metric for the location. In various embodiments, the network metric module 318 may provide the estimated voice call quality score for a location to the trial application 116 on the user device 102. In turn, the trial application 116 may present the estimated voice call quality score of the location via a display of the user device 102.

In additional embodiments, the network metric module 318 may present representative data performance metrics for specified locations, such as locations that have not been visited by the subscriber. For example, the network metric module 318 may provide representative data performance metrics 138 for the specified locations in response to requests that are inputted via the trial application 116 on a user device 102. A representative network performance metric for a location may be calculated based on the individual network performance metric values of one or more user devices that are comparable to the dual-SIM user device at the location during a recent time period. The individual network performance metric values may be retrieved by the network metric module 318 from the network performance database 140. The network metric module 318 may be configured to store trial service performance metrics for each user device that includes network quality metrics, the estimated voice call quality scores, and/or the representative data performance metrics collected or generated for each user device in the trial data store 134. The trial service performance metrics may be indexed in the trial data store 134 according to a unique user identifier associated with each user device. Further, the network metric module 318 may be configured to provide trial service performance metrics that includes network quality metrics, the estimated voice call quality scores, and/or the representative data performance metrics collected or generated for a user device or one or more previous user devices associated with a unique user identifier to a trial application on the user device for presentation. In various embodiments, the network metric module 318 may provide such information as long as the information in the account database 320 indicates the trial subscriber is active.

Example Processes

Figure 4A:
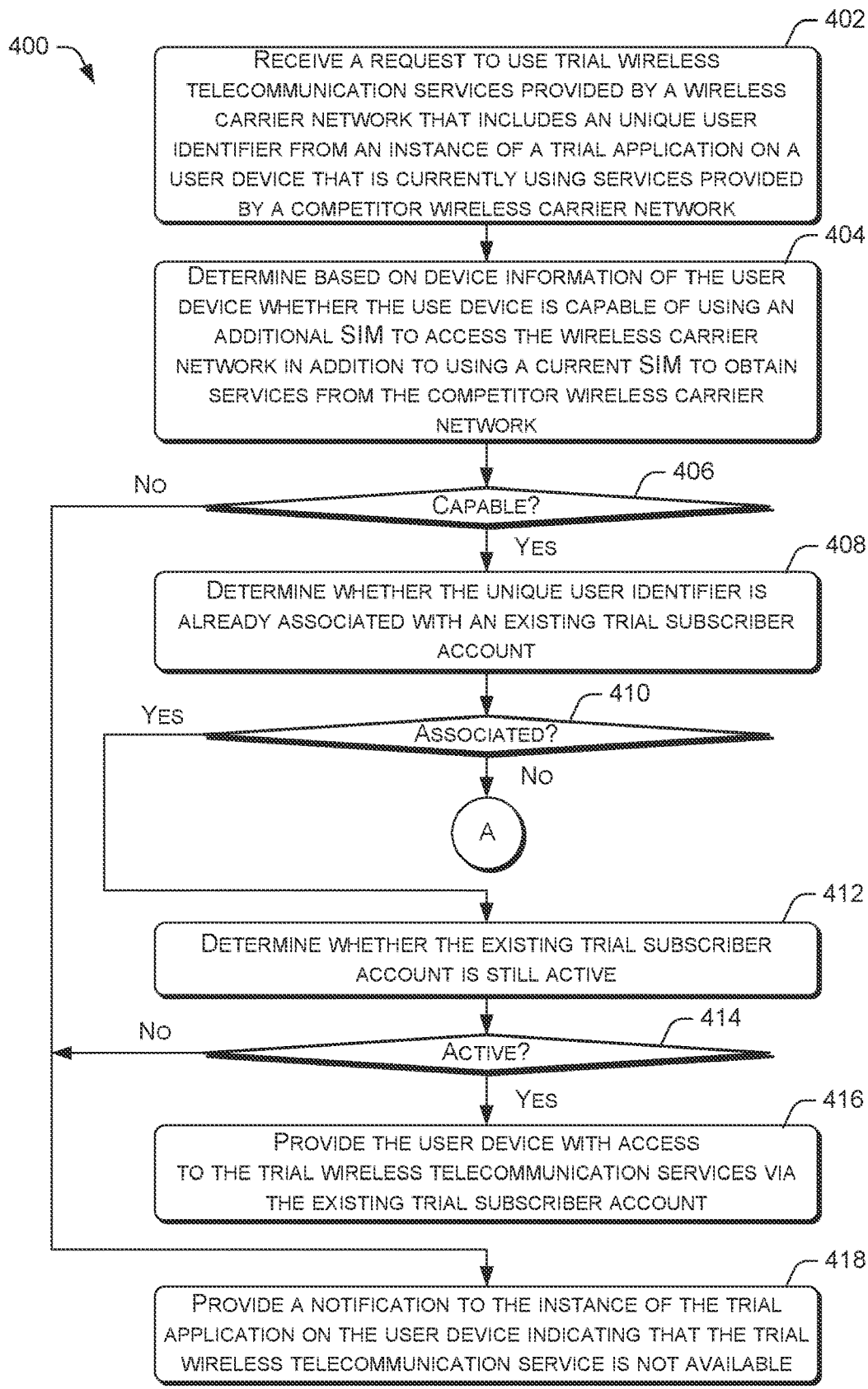
FIGS. 4a and 4b illustrate a flow diagram of an example process for implementing a trial use of the wireless telecommunication services provided by a wireless carrier network via a dual-SIM user device.
Figure 4B:
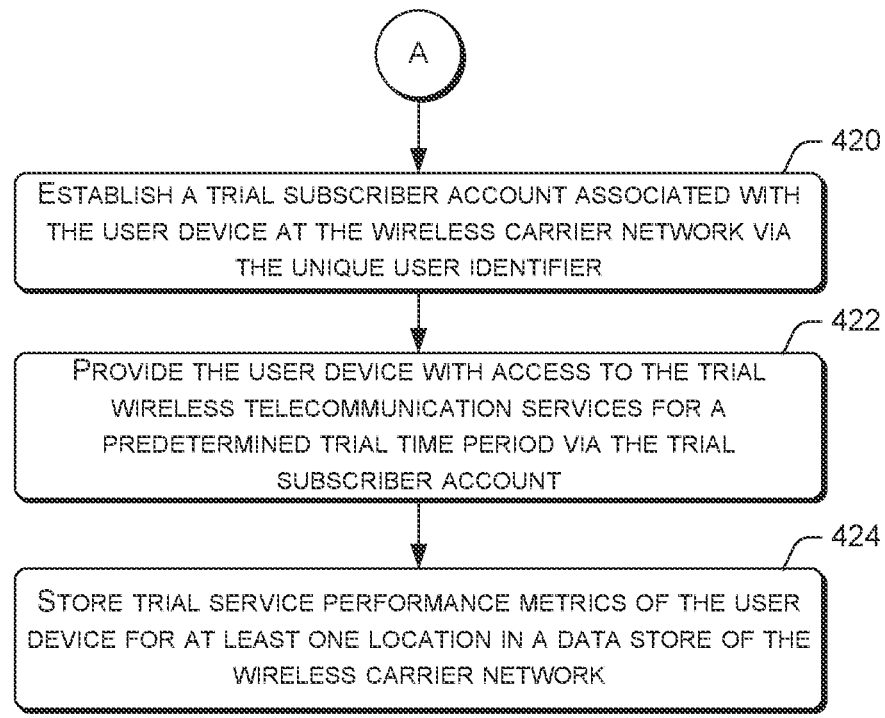
Figure 5:
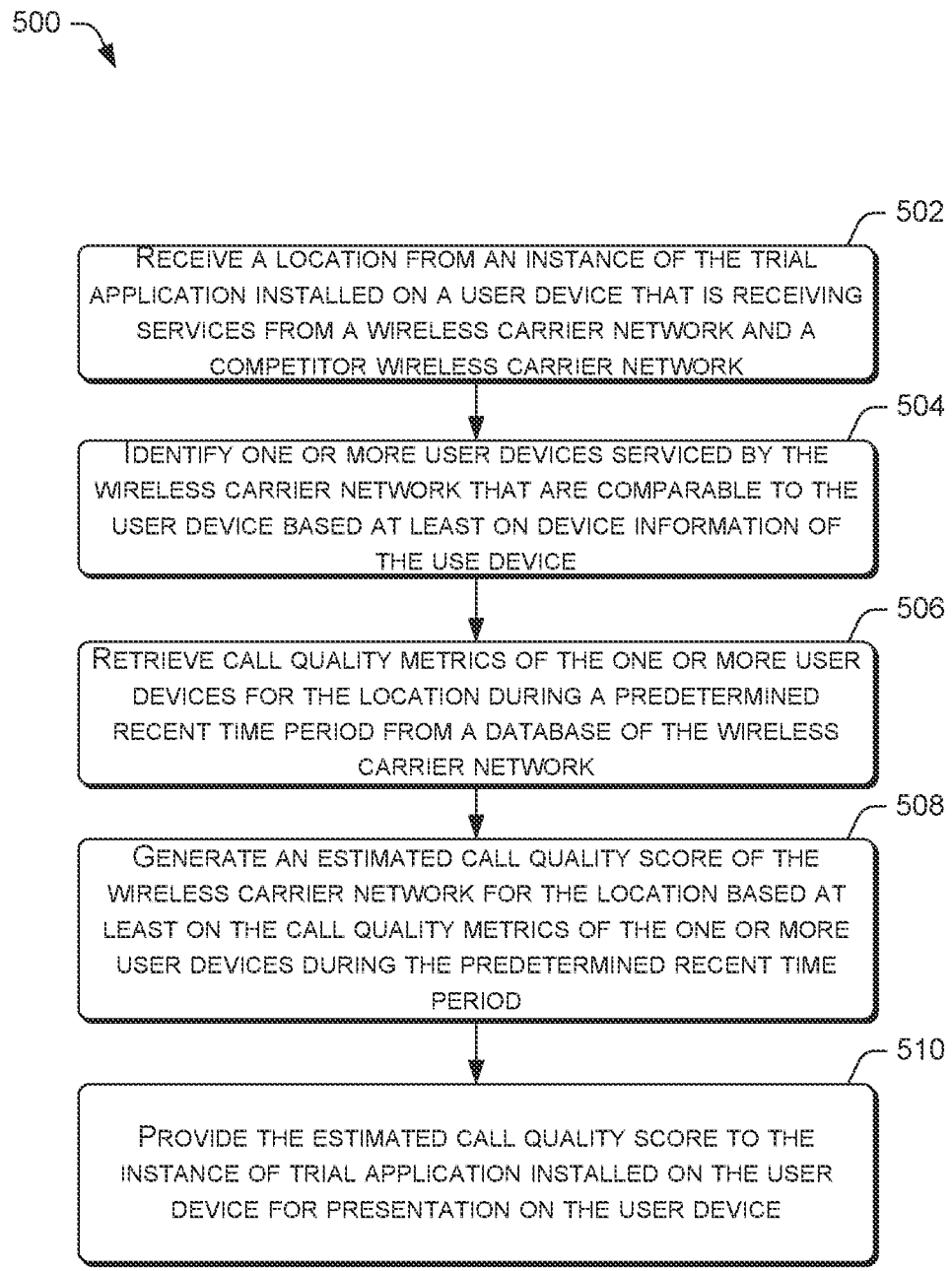
FIG. 5 illustrates a flow diagram of an example process for generating an estimated call quality score for a location-based at least on multiple call quality metrics collected by one or more user devices for the location.
Figure 6:
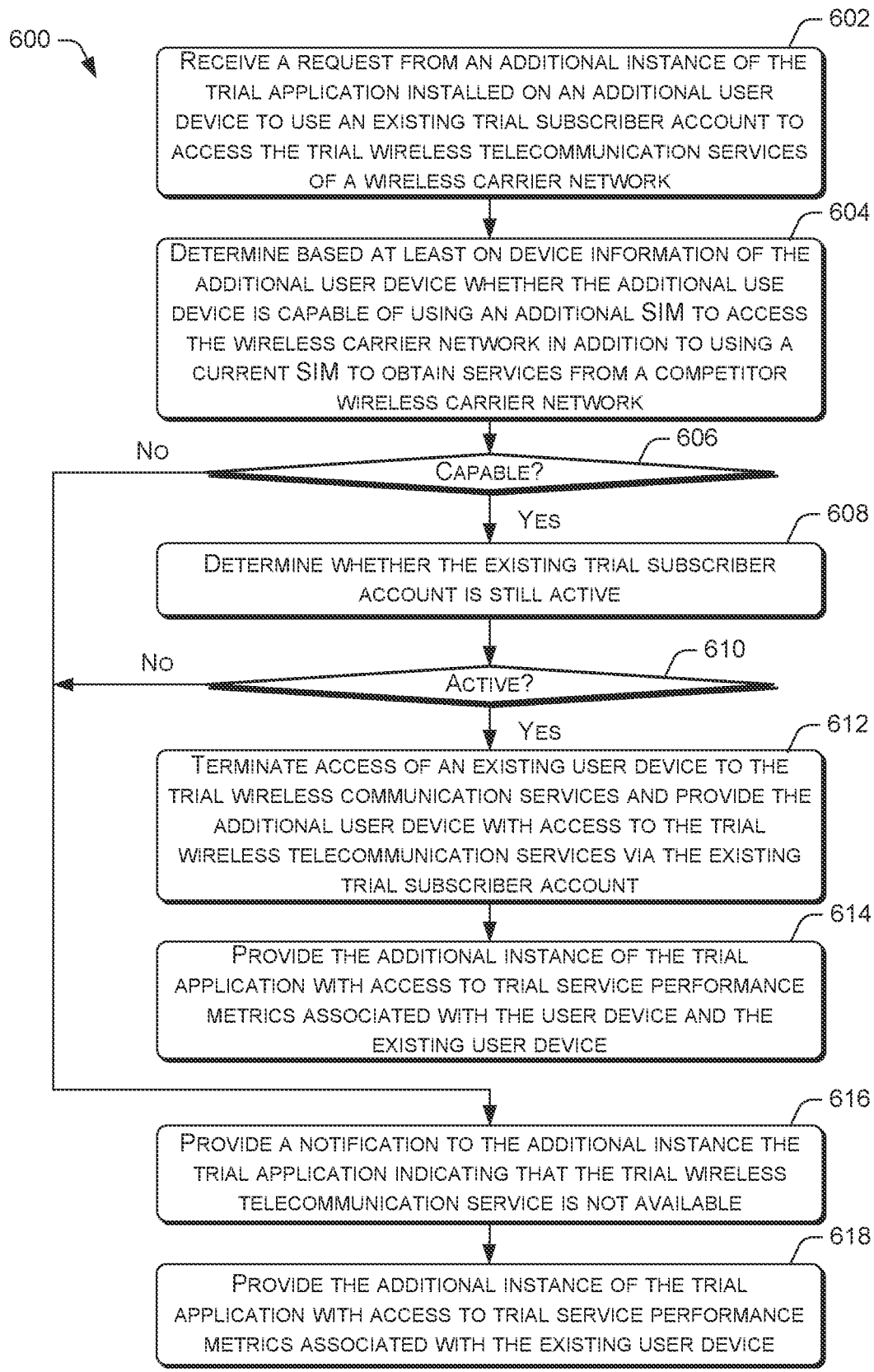
FIG. 6 is a flow diagram of an example process for switching the trial use of the wireless telecommunication services provided by a wireless carrier network to a new dual-SIM user device.

FIGS. 4-6 present illustrative processes 400-600 for using a dual-SIM user device to perform a trial use of the wireless telecommunication services provided by a wireless carrier network. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIGS. 4a and 4b illustrate a flow diagram of an example process 400 for implementing a trial use of the wireless telecommunication services provided by a wireless carrier network via a dual-SIM user device. At block 402, the network trial platform 124 may receive a request to use trial wireless telecommunication services provided by a wireless carrier network from an instance of a trial application on a user device that is currently using services provided by a competitor wireless carrier network, in which the request includes a unique user identifier. At block 404, the network trial platform 124 may determine based on device information of the user device whether the user device is capable of using an additional SIM to access the wireless carrier network in addition to using a current SIM to obtain services from the competitor wireless carrier network. For example, the network trial platform 124 may use a device identifier included in the request to retrieve the device information of the user device from one or more device databases 126 to make the determination.

At decision block 406, if the user device is determined to be capable ("yes" at decision block 406), the process 400 may proceed to block 408. At block 408, the network trial platform 124 may determine whether the unique user identifier is already associated with an existing trial subscriber account. At decision block 410, if the unique user identifier is associated with an existing trial subscriber account ("yes" at decision block 410), the process 400 may proceed to block 412. At block 412, the network trial platform 124 may determine whether the existing trial subscriber account is still active. For example, the trial subscriber account is configured to automatically become inactive at an end of a predetermined trial time period. At decision block 414, if the existing trial subscriber account is still active, ("yes" at decision block 414), the process 400 may proceed to block 416. At block 416, the network trial platform 124 may provide the user device with access to the trial wireless telecommunication services via the existing trial subscriber account. In various embodiments, this may involve provisioning the user device with a SIM that enables the user device to access the trial telecommunication services.

Returning to decision block 406, if the user device is determined to be incapable ("no" at decision block 406), the process 400 may proceed to block 418. At block 418, the network trial platform 124 may provide a notification to the instance of the trial application on the user device indicating that the trial wireless telecommunication service is not available.

Returning to decision block 410, if the unique user identifier is not associated with an existing trial subscriber account ("no" at decision block 410), the process 400 may proceed to block 420. At block 420, the network trial platform 124 may establish a trial subscriber account associated with the user device at the wireless carrier network via the unique user identifier. For example, the network trial platform 124 may direct a customer care function to establish the trial subscriber account. At block 422, the network trial platform 124 may provide the user device with access to the trial wireless telecommunication services for a predetermined trial time period via the trial subscriber account. At block 424, the network trial platform 124 may store trial service performance metrics of the user device for at least one location in a data store of the wireless carrier network. The trial service performance metrics may include network quality metrics, estimated voice call quality scores, and/or representative data performance metrics collected or generated for the user device. Returning to decision block 414, if the existing trial subscriber account is not active, ("no" at decision block 414), the process 400 may also proceed to block 418.

FIG. 5 illustrates a flow diagram of an example process 500 for generating an estimated call quality score for a location-based on multiple call quality metrics collected by one or more user devices for the location. At block 502, the network trial platform 124 may receive a location from an instance of the trial application installed on a user device that is receiving services from a wireless carrier network and a competitor wireless carrier network. The location may be included in a request for an estimated call quality score for the location sent by the instance of the trial application.

At block 504, the network trial platform 124 may identify one or more user devices serviced by the wireless carrier network that are comparable to the user device based at least on device information of the user device. In various embodiments, the network trial platform 124 may check a device identifier of the user device that made the request against the information in one or more device databases 126 to identify the device characteristics of the user device. The device characteristics of the user device are then used by the network trial platform 124 to identify one or more user devices with similar device characteristics as comparable.

At block 506, the network trial platform 124 may retrieve call quality metrics of the one or more user devices for the location during a predetermined recent time period from a database of the wireless carrier network. For example, the call quality metrics may be retrieved from the network performance database 140. At block 508, the network trial platform 124 may generate an estimated call quality score of the wireless carrier network for the location based at least on the call quality metrics of the one or more user device predetermined recent time periods. In various embodiments, the estimated call quality score may be generated via a mathematical algorithm or a machine-learning algorithm. At block 510, the network trial platform 124 may provide the estimated call quality score of the wireless carrier network to the instance of the trial application installed on the user device for presentation on the user device.

FIG. 6 is a flow diagram of an example process 600 for switching the trial use of the wireless telecommunication services provided by a wireless carrier network to a new dual-SIM user device. At block 602, the network trial platform 124 may receive a request from an additional instance of the trial application installed on an additional user device to use an existing trial subscriber account to access the trial wireless telecommunication services provided by the wireless carrier network.

At block 604, the network trial platform 124 may determine based at least on device information of the additional user device whether the additional user device is capable of using an additional SIM to access the wireless carrier network in addition to using a current SIM to obtain services from a competitor wireless carrier network. For example, the network trial platform 124 may use a device identifier included in the request to retrieve the device information of the additional user device from one or more device databases 126 to make the determination.

At decision block 606, if the user device is capable ("yes" at decision block 606), the process 600 may proceed to block 608. At block 608, the network trial platform 124 may determine whether the existing trial subscriber account is still active. At decision block 610, if the existing trial subscriber account is still active ("yes" at decision block 610), the process 600 may proceed to block 612. For example, the trial subscriber account is configured to automatically become inactive at an end of a predetermined trial time period. At block 612, the network trial platform 124 may terminate access of an existing user device to the trial wireless telecommunication services and provide the additional user device with access to the trial wireless telecommunication services via the existing trial subscriber account. For example, the network trial platform 124 may notify the HLR or the HSS of the wireless carrier network 114 to deactivate the SIM of the user device, as well as notify the RSP platform or the BSS of the wireless carrier network 114 to provision the additional user device with an active SIM that enables access to the trial wireless telecommunication services.

At block 614, the network trial platform 124 may provide the additional instance of the trial application with access to trial service performance metrics associated with the user device and the existing user device. The trial service performance metrics may include network quality metrics, estimated voice call quality scores, and/or representative data performance metrics collected or generated for the user device and the existing user device. Returning to decision block 606, if the user device is not capable ("no" at decision block 606), the process 600 may proceed to block 616. At block 616, the network trial platform 124 may provide a notification to the additional instance of the trial application indicating that the trial wireless telecommunication is not available. At block 618, the network trial platform 124 may provide the additional instance of the trial application with access to trial service performance metrics associated with the existing user device. The trial service performance metrics may include network quality metrics, estimated voice call quality scores, and/or representative data performance metrics collected or generated for the existing user device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a request to use trial wireless telecommunication services provided by a wireless carrier network from an instance of a trial application on a user device that is currently using wireless telecommunication services provided by a competitor wireless carrier network;
   determining based at least on device information of the user device whether the user device is capable of using of an additional subscriber identification module (SIM) to access the wireless carrier network in addition to using a current SIM to obtain the wireless telecommunication services from the competitor wireless carrier network; and
   in response to a determination that the user device is capable of supporting the use of the additional SIM to access the wireless carrier network, establishing a trial subscriber account associated with the user device at the wireless carrier network to provide the user device with access to trial wireless telecommunication services of the wireless carrier network for a predetermined trial time period via the trial subscriber account.

2. The one or more non-transitory computer-readable media of claim 1, wherein the acts further comprise storing trial service performance metrics of the user device for at least one location that are collected during the predetermined trial time period, the trial service performance metrics including at least one of network quality metrics, estimated voice quality scores, or representative data performance metrics for the at least one location.

3. The one or more non-transitory computer-readable media of claim 2, wherein the acts further comprise providing the trial service performance metrics to the instance of the trial application on the user device for presentation on a coverage map.

4. The one or more non-transitory computer-readable media of claim 1, wherein the acts further comprise, in response to a determination that the user device is incapable of supporting the additional SIM associated with the wireless carrier network, providing a notification to the user device indicating that the trial wireless telecommunication services are not available.

5. The one or more non-transitory computer-readable media of claim 1, wherein the acts further comprise:
   receiving a query from the user device from the instance of the trial application on the user device for an estimated voice call quality score of a location;
   identifying one or more user devices serviced by the wireless carrier network that are comparable to the user device based at least on device information of the user device;
   retrieving call quality metrics of the one or more user devices for the location during a predetermined time period from a network performance database of the wireless carrier network;
   generating an estimated call quality score for the location based at least on the call quality metrics of the one or more user devices during the predetermined time period; and
   providing the estimated call quality score of the wireless carrier network to the instance of the trial application installed on the user device for presentation by the instance of the trial application.

6. The one or more non-transitory computer-readable media of claim 5, wherein the generating includes using a mathematical algorithm or a machine-learning algorithm to generate the estimated call quality score for the location based at least on the call quality metrics of the one or more user devices during the predetermined time period.

7. The one or more non-transitory computer-readable media of claim 1, wherein the establishing includes establishing the trial subscriber account using a unique user identifier provided for an establishment of the trial subscriber account when the unique user identifier is not associated with an existing trial subscriber account used to access the trial wireless telecommunication services of the wireless carrier network.

8. The one or more non-transitory computer-readable media of claim 1, wherein the acts further comprise:
   receiving a request to use the trial subscriber account to access the trial wireless telecommunication services from an additional instance of the trial application installed on an additional user device;
   determining whether the trial subscriber account for accessing the trial wireless telecommunication services is active, the trial subscriber account being configured to automatically become inactive at an end of the predetermined trial time period;
   in response to the trial subscriber account being active, switching access to the trial wireless telecommunication services to the additional user device by terminating access of the user device to the trial wireless telecommunication services and providing the additional user device with access to the trial wireless telecommunication services via the trial subscriber account; and
   in response to the trial subscriber account being inactive, providing the additional instance of the trial application with access to trial service performance metrics associated with the user device.

9. The one or more non-transitory computer-readable media of claim 8, wherein the acts further comprise in response to the trial subscriber account being active, providing the additional instance of the trial application with access to trial service performance metrics associated with the user device.

10. The one or more non-transitory computer-readable media of claim 8, wherein the switching includes switching when the additional user device is determined to be capable of supporting the use of a secondary SIM to access the wireless carrier network in addition to using a primary SIM to obtain the wireless telecommunication services from another wireless carrier network.

11. A system, comprising:
one or more processors; and
memory including a plurality of computer-executable components that are executable by the one or more processors to perform a plurality of actions, the plurality of actions comprising:
receiving a request to use trial wireless telecommunication services provided by a wireless carrier network from an instance of a trial application on a user device that is currently using wireless telecommunication services provided by a competitor wireless carrier network, the request being associated with a unique user identifier;
determining whether the unique user identifier is associated with an existing trial subscriber account used to access the trial wireless telecommunication services provided by the wireless carrier network;
in response to a determination that the unique user identifier is not associated with the existing trial subscriber account, establishing a trial subscriber account associated with the user device at the wireless carrier network to provide the user device with access to trial wireless telecommunication services of the wireless carrier network for a predetermined trial time period via the trial subscriber account; and
in response to a determination that the unique user identifier is associated with the existing trial subscriber account, providing the user device with access to the trial wireless telecommunication services of the wireless carrier network via the trial subscriber account when the trial subscriber account is active.

12. The system of claim 11, wherein the trial subscriber account is configured to automatically become inactive at an end of a predetermined trial time period, and wherein the plurality of actions further comprise in response to a determination that the unique user identifier is associated with the existing trial subscriber account, providing a notification to the instance of the trial application on the user device indicating that the trial wireless telecommunication service is not available when the trial subscriber account is inactive.

13. The system of claim 11, wherein the determining includes determining whether the unique user identifier is associated with the existing trial subscriber account when the user device is determined to be capable of using an additional subscriber identification module (SIM) to access the wireless carrier network in addition to using a current SIM to obtain the wireless telecommunication services from the competitor wireless carrier network.

14. The system of claim 11, wherein the plurality of actions further comprise storing trial service performance metrics of the user device for at least one location that are collected during the predetermined trial time period, the trial service performance metrics including at least one of network quality metrics, estimated voice quality scores, or representative data performance metrics for the at least one location.

15. The system of claim 14, wherein the acts further comprise providing the trial service performance metrics to the instance of the trial application on the user device for presentation on a coverage map.

16. The system of claim 11, wherein the actions further comprise:

receiving a query from the user device from the instance of the trial application on the user device for an estimated voice call quality score of a location;
identifying one or more user devices serviced by the wireless carrier network that are comparable to the user device based at least on device information of the user device;
retrieving call quality metrics of the one or more user devices for the location during a predetermined time period from a network performance database of the wireless carrier network;
generating the estimated call quality score for the location based at least on the call quality metrics of the one or more user devices during the predetermined time period; and
providing the estimated call quality score of the wireless carrier network to the instance of the trial application installed on the user device for presentation by the instance of the trial application.

17. The system of claim 16, wherein the generating includes using a mathematical algorithm or a machine-learning algorithm to generate the estimated call quality score for the location based at least on the call quality metrics of the one or more user devices during the predetermined time period.

18. The system of claim 11, wherein the acts further comprise:
receiving a request to use the trial subscriber account to access the trial wireless telecommunication services from an additional instance of the trial application installed on an additional user device;
determining whether the trial subscriber account for accessing the trial wireless telecommunication services is active;
in response to the trial subscriber account being active, switching access to the trial wireless telecommunication services to the additional user device by terminating access of the user device to the trial wireless telecommunication services and providing the additional user device with access to the trial wireless telecommunication services via the trial subscriber account; and
in response to the trial subscriber account being inactive, providing the additional instance of the trial application with access to trial service performance metrics associated with the user device.

19. A computer-implemented method, comprising:
receiving, at one or more computing devices of a wireless carrier network, a request to use trial wireless telecommunication services provided by the wireless carrier network from an instance of a trial application on a user device that is currently using wireless telecommunication services provided by a competitor wireless carrier network;
determining, at the one or more computing devices, based at least on device information of the user device whether the user device is capable of using of an additional subscriber identification module (SIM) to access the wireless carrier network in addition to using a current SIM to obtain the wireless telecommunication services from the competitor wireless carrier network; and
in response to a determination that the user device is capable of supporting the use of the additional SIM to access the wireless carrier network, establishing, at the one or more computing devices, a trial subscriber account associated with the user device at the wireless carrier network to provide the user device with access to trial wireless telecommunication services of the wireless carrier network for a predetermined trial time period via the trial subscriber account.

20. The computer-implemented method of claim 19, further comprising in response to a determination that the user device is incapable of supporting the additional SIM associated with the wireless carrier network, providing, via the one or more computing devices, a notification to the user device indicating that the trial wireless telecommunication service is not available.

* * * * *